United States Patent
Tobie et al.

(10) Patent No.: US 7,477,418 B2
(45) Date of Patent: Jan. 13, 2009

(54) METHOD AND SYSTEM FOR CORRECTING COLOR RENDERING DEVICES

(75) Inventors: C. David Tobie, Mount Vernon, ME (US); Brian Levey, Yardley, PA (US); Kiran Chintanippu, Levittown, PA (US)

(73) Assignee: Datacolor Holding AG, Luzern (CH)

( * ) Notice: Subject to any disclaimer, the term of this patent is extended or adjusted under 35 U.S.C. 154(b) by 946 days.

(21) Appl. No.: 10/878,278

(22) Filed: Jun. 28, 2004

(65) Prior Publication Data

US 2005/0248786 A1    Nov. 10, 2005

Related U.S. Application Data

(60) Provisional application No. 60/568,488, filed on May 6, 2004.

(51) Int. Cl.
*H04N 1/56* (2006.01)
*H04N 1/60* (2006.01)

(52) U.S. Cl. .................. 358/1.9; 358/504; 358/518
(58) Field of Classification Search ............... 358/1.9, 358/406, 504, 518, 521, 523, 524
See application file for complete search history.

(56) References Cited

U.S. PATENT DOCUMENTS

| | | | |
|---|---|---|---|
| 5,537,516 A | 7/1996 | Sherman et al. | |
| 6,736,478 B2 | 5/2004 | Franzke et al. | |
| 7,085,004 B2* | 8/2006 | Sharma et al. | 358/1.9 |
| 7,319,545 B2* | 1/2008 | Linder et al. | 358/1.9 |
| 2004/0160618 A1* | 8/2004 | Nogiwa | 358/1.9 |

* cited by examiner

*Primary Examiner*—Thomas D Lee

(57) ABSTRACT

A method and system for calibrating color rendering devices includes determining a model-specific Digital Target for a first reference color rendering device and a non-CIE color measuring device combination, and implementing the determined model-specific Digital Target for calibrating color rendering devices having substantially similar rendering characteristics as the first reference color rendering device.

36 Claims, 6 Drawing Sheets

METHOD AND SYSTEM FOR CORRECTING COLOR RENDERING DEVICES

CROSS-REFERENCE TO RELATED APPLICATIONS

This application claims benefit of U.S. provisional patent application Ser. No. 60/568,488, filed May 6, 2004, which is herein incorporated by reference in its entirety.

BACKGROUND OF THE INVENTION

1. Field of the Invention

Embodiments of the present invention generally relate to the color calibration of color rendering devices and more specifically, to a method and system for generating color profiles to be applied to known color rendering devices to correct for color rendering errors.

2. Description of the Related Art

In the field of color rendering systems, it is commonly necessary to calibrate color rendering devices such as printers to make print colors output by the color rendering devices conform to standards and to compensate for drift and other changes. Thus, calibration is required to fine tune the color response of the color rendering device.

Printing devices typically apply three or four colorants such as cyan, magenta, yellow, and black inks. For printing both reflective prints and transparencies, the density of colorants is directly related to the quantity of ink laid down. The acronym CMYK refers to cyan, magenta, yellow, and black inks that are typically used in printing reflective prints. Cyan, magenta, and yellow are also the terms used to describe three subtractive primaries. Because inks and dyes combine in a complicated way, CMY colorants behave differently from and approximately like the true subtractive primaries: cyan, magenta, and yellow. CMY is subsequently used herein to denote colorant values.

Various printers render color differently because the colorants that they use mix differently and have different spectral characteristics. In addition, colors vary between individual printers of the same type, and the colors produced by an individual printer vary with time.

A scanner is a device for converting pictures, artwork, documents, transparencies, and photographs into electronic form such as digital image data. The scanner captures an image by measuring colors reflected from or transmitted through an image at many points (or small areas) and assigning numerical values to the colors at these points. It is common in the art to use an RGB representation scheme for electronic image colors measured by a color scanner although some scanners subsequently convert the RGB values to CMYK values. A typical digital image comprises picture elements, also called pixels that are arranged into rows and columns. These pixels together make up the image as stored in digital form and as displayed on a visual display. Each pixel of the digital image contains, among other information, the color information for that particular pixel. In the RGB scheme, the color information of each pixel is defined as having some quantity of each of the additive primary colors red (R), green (G), and blue (B). Scanners measure the color at each area, representing a pixel, of a print or transparency. Such scanners typically output RGB values.

Appearance values in appearance variable color spaces are defined as values produced by any reversible transformation of RGB. Appearance values include R, G, and B values. Other representation schemes that use appearance variable color spaces include the HSB scheme, the subtractive primary (CMY) scheme and colorimetric schemes. In the HSB scheme, the color information of each pixel is defined in quantities of hue, saturation, and brightness. The HSB appearance variables are hue, saturation, and brightness or brilliance, wherein the color of each pixel is represented by a point in the HSB color space. In the subtractive primary (CMY) scheme, the color information of each pixel is defined by the amount of the three subtractive primaries cyan (c), magenta (m), and yellow (y), which are typically not colorant amounts, as stated above. Colorimetric schemes for specifying color include use of the mathematical spaces CIELAB, CIELUV, CIEXYZ and xyY.

Prior art techniques for calibrating a color measuring device include a calorimeter for measuring the CIE values of color on a page, for example in CIEXYZ or CIELAB units. The measured CIE values are compared with a corresponding scale of desired values to obtain calibration curves.

Other prior art systems for performing printer calibration include a scanner for scanning a target. A disadvantage of using a scanner instead of a colorimeter, however, is that scanners typically use filters having spectral responses that are not optimized for measuring colorants as used in printing. Another disadvantage is that scanners operate on a sensitivity (linear) scale, not a density (logarithmic) scale. A further disadvantage is that scanners have small apertures leading to low signal-to-noise ratio (SNR). Yet another disadvantage is that the tonal and spectral responses of scanners are not standardized and thus vary from one scanner to another. Thus, different scanners do not necessarily produce the same appearance values for a spectrally identical measured color. Even further, the dynamic input range of a typical desktop scanner is generally smaller than the output dynamic range of a printer. Consequently, scanners may not accommodate measuring the entire range of ink densities that printers are able to produce. Yet another disadvantage is that the inherent resolution of the printing device, for example, a color laser printer, that generates color samples to be measured by a scanner may be close or identical to the inherent resolution of the scanner used to read the color samples. Consequently, a resolution conflict occurs that commonly manifests itself as interference patterns in the scanner signals of the image.

SUMMARY OF THE INVENTION

The present invention generally provides a method and system for making model-specific color rendering device corrections in, for example, an International Color Consortium (ICC) profile for a reference instrument of the same character (model).

In various embodiments of the present invention, a non-CIE color measuring device is used to measure multicolor targets generated from a multi-color Digital Target and reproduced by a reference color rendering device. In addition, a CIE color measuring device is also used to measure the multicolor targets generated from a multi-color Digital Target and reproduced by the reference color rendering device. A non-CIE profile and a CIE profile are determined from the respective color measurements. Test Images are created using the non-CIE profile and the CIE profile. The Test Images are then compared under controlled conditions to determine if any color differences exist.

In response to color differences in the Test Images, the color patches of the multi-color Digital Target are adjusted in a manner tending to cause the color differences to be reduced. The adjusted Digital Target is then again reproduced on the color rendering device and measured by the non-CIE color measuring device. A non-CIE profile is again determined and a Test Image is created using the non-CIE profile. The two Test Images are again compared under the controlled conditions to determine if any color differences exist. The above procedure is iteratively repeated until any color differences between the Test Image created using the non-CIE profile and the CIE profile are within predetermined allowable values. When the Test Images are within predetermined allowable values, the respective adjusted Digital Target is defined as a model-specific Digital Target for the color rendering device and color measuring device combination. The model-specific Digital Target is then reproduced on a second color rendering device, having substantially similar rendering characteristics as the first color rendering device, and is measured by the first non-CIE measuring device, or a second non-CIE measuring device having substantially similar measuring characteristics as the first non-CIE color measuring device, to determine a correction profile for the second color rendering device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
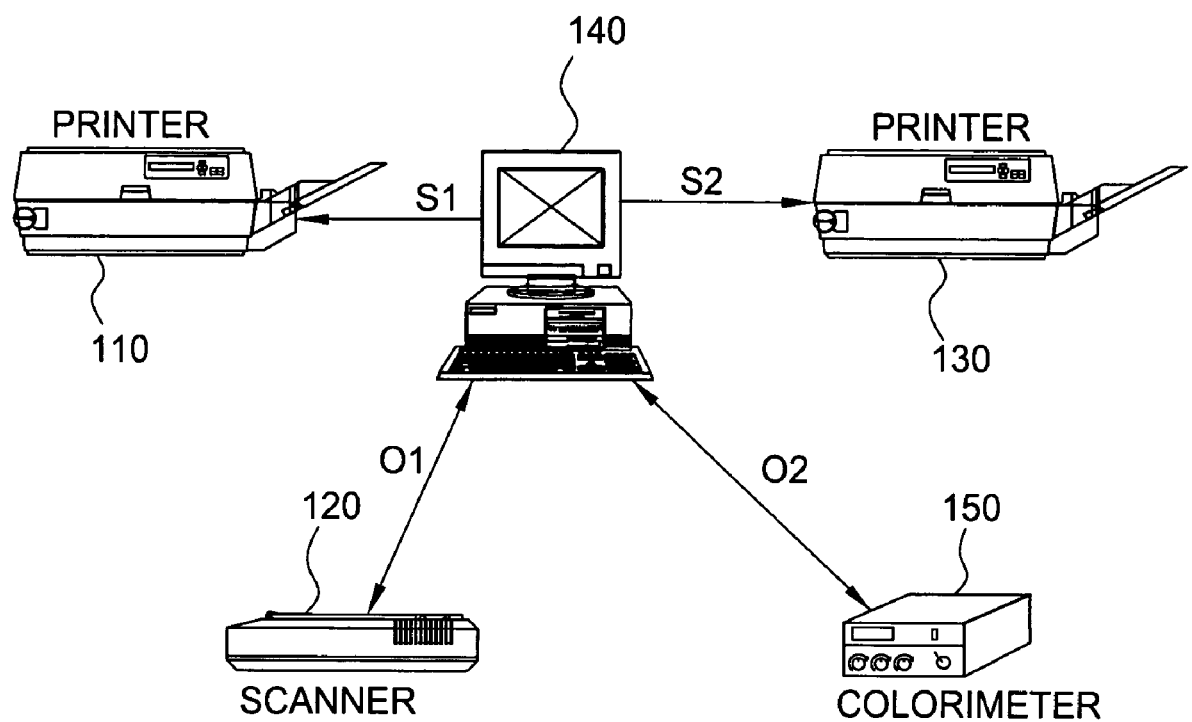
FIG. 1 depicts a high level block diagram of an embodiment of a color correction system in accordance with the present invention.

The present invention advantageously provides a method and system for making model-specific printer corrections in a printer profile generated from a model based ICC profile or non-ICC model adjustments for a reference instrument of the same character (model). The principle of correcting a model-specific calibration is first applied to a particular scanner. The calibrated scanner is then used to measure multicolor targets printed by a printer-under-test. A profile of the printer-under-test is then adjusted until the input digital values of each target color are such that the measured scanner values match the scanner values of a calibrated unit of the same model as the printer-under-test. Although various embodiments of the present invention are described herein with respect to the correction of a specific printer using measurements made by a scanner, the specific embodiments of the present invention should not be treated as limiting the scope of the invention. It will be appreciated by those skilled in the art informed by the teachings of the present invention that the concepts of the present invention may be advantageously applied to the correction of substantially any known color rendering device using the measurements made by substantially any color measuring device.

In accordance with the present invention, a model-specific Digital Target is determined for a known first color rendering device/color measuring device combination such that a second color rendering device having substantially similar printing characteristics as the first color rendering device is able to be calibrated using the first color measuring device or a second color measuring device having substantially similar measuring capabilities as the first color measuring device. A second color rendering device is defined as having substantially similar printing characteristics as a first color rendering device if the printing characteristics of the second color rendering device are able to be corrected to within a predetermined tolerance of the first color rendering device. For example, if a second color rendering device is of the same make and model and using the same inks and paper as a first, reference color rendering device, then the printing characteristics of the second color rendering device should be able to be corrected to print the same as the first color rendering device. However, if the second color rendering device is not of the same model or using the same inks or paper as the first color rendering device, then the printing characteristics of the second color rendering device may not be able to be corrected to within a predetermined tolerance of the first, reference, color rendering device. A user, however, may predetermine a tolerance defining how closely the color reproduction of a second color rendering device must be to the color reproduction of a first, reference color rendering device to classify the model of the second color rendering device (using specified inks and paper) as a color reproduction device that may be corrected by the first, reference color rendering device and thus having substantially similar printing characteristics as the first color rendering device. Similarly, a second color measuring device is defined as having substantially similar measuring characteristics as a first color measuring device if the measuring characteristics of the second color measuring device are within a predetermined tolerance of the first color measuring device as defined above.

Within the concepts of the present invention, Digital Targets to be reproduced by color rendering devices may be adjusted to account for the printing characteristics of a specific color rendering device or family of color rendering devices and for the measuring characteristics of an implemented non-CIE color measuring device. The Digital Targets may be modified using a plurality of variables including gamma, saturation, linearity, hue, brightness and the like. Although the color reproduction of color rendering devices are described above as printing characteristics, color rendering devices may reproduce colors in other media, such as electronic images, and such color rendering is included within the concepts of the present invention.

FIG. 1 depicts a high level block diagram of an embodiment of a color correction system in accordance with the present invention. The color correction system 100 of FIG. 1 includes a reference color rendering device (illustratively a first printer) 110, a non-CIE test color measuring device (illustratively a test scanner) 120, a color rendering device under test (illustratively a second printer of the same model as the reference printer) 130, a computer workstation 140 and a CIE color measuring device (illustratively a calorimeter) 150. As depicted in FIG. 1, the reference color rendering device 110, the test color measuring device 120, the color rendering device under test 130 and the calorimeter 150 are all in communication with the computer workstation 140. Although the color correction system 100 of FIG. 1 is depicted as comprising a single non-CIE test color measuring device 120, in alternate embodiments of the present invention, a second, reference non-CIE color measuring device is included for use in the calibration of the non-CIE test color measuring device 120 as is described in greater detail below with regard to an alternate embodiment of the present invention. Furthermore, although the color correction system 100 of FIG. 1 is depicted as comprising a computer workstation 140, a controller having similar functions may be implemented in place of the computer workstation 140 of the present invention.

For the purposes of explanation herein, a CIE color-measuring device may be defined as a light-sensing device whose spectral sensitivities as functions of wavelength can be linearly combined to give, substantially, the three color-matching functions of one of the CIE Standard Observers. Along the same lines, a non-CIE color-measuring device may be defined as a light-sensing device whose spectral sensitivities as functions of wavelength cannot be linearly combined to give, substantially, the three color-matching functions of any of the CIE Standard Observers. In addition, a CIE profile (described below) may be defined as a mapping, or digital implementation of that mapping, from the values that control the colors of a color-rendering device to CIE tristimulus values, based on a spectro-colorimeter's measurements of colors rendered by that color-rendering device.

Figure 2:
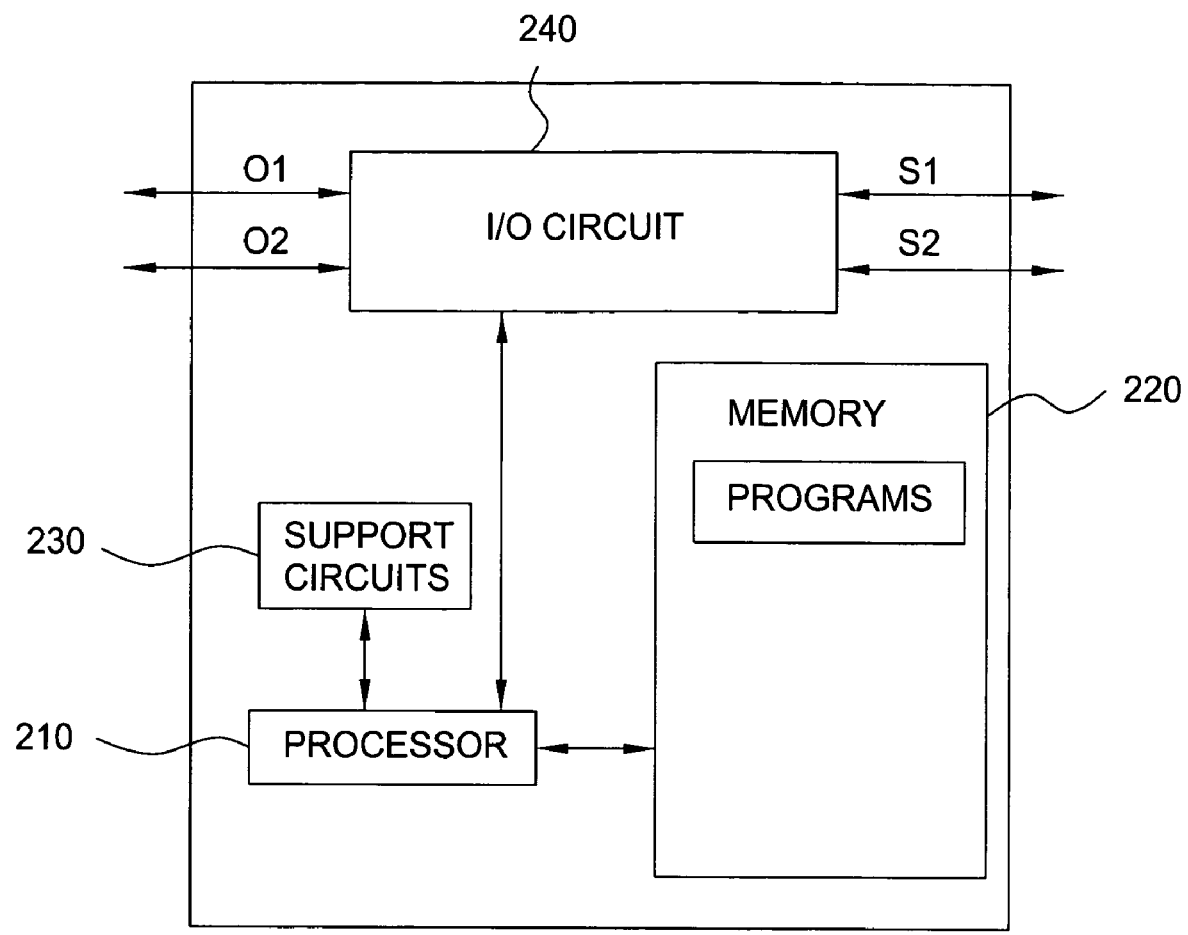
FIG. 2 depicts a high level block diagram of an embodiment of a computer workstation suitable for use in the color correction system of FIG. 1.

FIG. 2 depicts a high level block diagram of an embodiment of a computer workstation (or controller) suitable for use in the color correction system 100 of FIG. 1. The computer workstation 140 of FIG. 2 comprises a processor 210 as well as a memory 220 for storing information, algorithms and control programs. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The computer workstation 140 also contains input-output circuitry 240 that forms an interface between the various functional elements communicating with the computer workstation 140. For example, in the embodiment of FIG. 1, the computer workstation 140 communicates with the reference color rendering device 110 via a signal path S1, with the color rendering device under test 130 via a signal path S2 and communicates with the test non-CIE color measuring device 120 via a signal path O1 and with the CIE color measuring device 150 via a signal path O2.

Although the computer workstation 140 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In the color correction system 100 of FIG. 1, a Digital Target is printed by the reference printer 110. More specifically, a predetermined set of color patches digitally stored in the computer workstation 140 is printed by the reference printer 110 to produce a calibration target. The Digital Target is configured such that when printed as a calibration target on the reference printer 110, the gamut of colors able to be printed by the reference printer 110 are substantially represented in the printed calibration target. The calibration target may comprise, for example, 729 colors (each color associated with CIE L*, a*, b* values).

The calibration target printed by the reference printer 110 is measured on the calorimeter 150 and the color values measured by the colorimeter are communicated to and stored at the computer workstation 140. At the computer workstation, a correction profile, a CIE profile, is determined for the reference printer 110 from the color values measured by the calorimeter 150. The CIE profile is stored at the computer workstation 140. A Test Image is then printed on the reference printer 110 using the CIE profile determined from the color measurements obtained by the calorimeter 150 of the calibration target printed on the reference printer 110.

The original calibration target generated from the Digital Target and printed by the reference printer 110 is also measured by the test scanner 120. The color measurement values obtained by the test scanner 120 for the calibration target printed by the reference printer 110 are communicated to and stored at the computer workstation 140. At the computer workstation 140, a correction profile, a non-CIE profile, is determined for the reference printer 110 from the color values measured by the test scanner 120 of the calibration target. The non-CIE profile is stored at the computer workstation 440. The same Test Image printed using the CIE profile is then again printed on the reference printer 110, however, the Test Image is now printed using the non-CIE profile.

Differences between the color values of the original calibration target generated from the Digital Target as measured by the test scanner 120 and the CIELab color values of the original calibration target as measured by the calorimeter 150 are attributable to errors in the measurements of the test scanner 120. More specifically, uncorrected scanner-based printer profiling fails basic standards of CIE colorimetry because scanner filters are edge filters, not broadband, and scanners use varying and unknown light sources, thus not producing data that reflects the human eye's response to color. The non-CIE nature of the data produced from scanner color measurements does not accurately reflect the human eye's response to the different colorants used in the preprinted scanner profiling target.

To correct for the non-CIE errors attributable to the test scanner 120, the Test Image printed using the CIE profile is visually compared to the Test image printed using the non-CIE profile under controlled lighting, for example D50 lighting, to judge, for example, the color hues, saturations, gradients, densities and other image color factors to determine if the printed Test Images are the same. If any visual differences exist in the colors of the printed Test Images, the color patches of the Digital Target are adjusted in a manner tending to cause the color differences to be reduced to ultimately determine a model-specific Digital Target to be used to calibrate other color rendering devices of the same model as or having substantially similar color rendering characteristics as the reference printer 110. More specifically, the input digital values of each target color of the Digital Target used for generating a calibration target are adjusted and a manipulated calibration target reflecting the adjusted color values of the Digital Target is printed on the reference printer 110. Color measurements of the manipulated calibration target printed on the reference printer 110 are taken on the test scanner 120. The color measurement values obtained by the test scanner 120 for the manipulated calibration target printed by the reference printer 110 are communicated to the computer workstation 140. At the computer workstation 140, the color measurement values obtained from the test scanner 120 for the manipulated calibration target printed on the reference printer 110 are used to determine a manipulated non-CIE profile.

The Test Image is then printed on the reference printer 110 using the determined manipulated non-CIE profile. The Test Image printed using the manipulated non-CIE profile is then visually compared to the Test Image printed using the CIE profile under the same controlled conditions as described above. If any differences exist in the printed Test Images, the color patches of the Digital Target are again adjusted to, as described above, determine a new non-CIE profile from the measurements of a manipulated calibration target such that any color differences between the Test Image printed using the CIE profile and a Test Image printed using the newly determined non-CIE profile are reduced.

The process describe above is repeated in an iterative manner until color differences between the Test Image printed using the CIE profile and a Test Image printed using a determined non-CIE profile, as described above, are within predetermined allowable values. That is, the steps described above are repeated (i.e., the color patches of the Digital Target are adjusted) until a non-CIE profile is determined such that when applied to the reference printer 110, color differences between a Test Image printed by the reference printer 110 using the CIE profile and the Test Image printed by the reference printer 110 using the determined non-CIE profile are within predetermined allowable values. The finally adjusted Digital Target implemented to reduce the color differences between a Test Image printed on the reference printer 110 using the CIE profile and the Test Image printed using a newly determined non-CIE profile to within predetermined allowable values, is stored at the computer workstation 140 as a model-specific Digital Target. The predetermined allowable amounts that the color differences between a Test Image printed by the reference printer 110 using the CIE profile may vary from the Test Image printed by the reference printer 110 using the determined non-CIE printer are dynamic values that are user determinable depending on the sensitivity desired in a color correction system of the present invention. For example, a user may predetermine allowable values that each of the printable colors of the reference printer may vary between the visually determined color values of a Test Image printed by the reference printer 110 using the CIE profile and the visually determined colors of a Test Image printed by the reference printer 110 using the determined non-CIE printer. Using the above-described process of the present invention described above, the color measurement errors of the test scanner 120 due to its non-CIELab nature are corrected for.

For example, if the reference printer 110 of the color correction system 100 of FIG. 1 comprises an Epson Stylus 2200 printer and the test scanner 120 of the color correction system 100 comprises a Syscan 660 scanner, then the determined model-specific Digital Target, printed as a calibration target on the Epson Stylus 2200 printer and scanned on the Syscan 660 scanner such that the color differences between a Test Image printed on the Epson Stylus 2200printer 110 using the CIE profile and a Test Image printed using a respectively determined non-CIE profile are within predetermined allowable values, is saved at the computer workstation 140 as a Syscan 660/Epson Stylus 2200 Digital Target. The model-specific Digital Target is stored at the computer workstation 140 to be used in the calibration of other color rendering devices of the same model or models comprising substantially similar printing functions as the reference printer 110 and using the same or a substantially similar color measuring device for non-CIE color measurements. That is, the model-specific Digital Target will correct for non-CIE errors in this one color rendering device/color measuring device combination.

Referring back to the color correction system 100 of FIG. 1, the determined model-specific Digital Target stored at the computer workstation 140 is printed on the printer under test 130 to generate a model-specific calibration target. The model-specific calibration target is then measured by the test scanner 120. The color measurement values obtained by the test scanner 120 are communicated to the computer workstation 140. At the computer workstation 140, the color measurement values obtained by the test scanner 120 for the model-specific calibration target generated from the unit specific Digital Target and printed on the printer under test 130 are used to determine a correction profile for the printer under test 130. The correction profile determined from the color measurements made by the test scanner 120 is applied to the printer under test 130 to correct the color of any subsequent prints made by the printer under test 130. More specifically, the determined correction profile may be applied to, for example, an International Color Consortium (ICC) profile of the printer under test 130 to correct for color errors in images printed by the printer under test 130. The ICC Profile Format is a file format that is described in the paper, International Color Consortium Profile Format (version 3.01, May 8, 1995). As described in the paper, a "profile" is a data table which is used for color conversion, the translation of color image data from one color or colorant coordinate system to another. The ICC Profile Format provides for embedding profiles with image data. Generally, test scanner-measured RGB values of patches from a model-specific calibration target generated from a model-specific Digital Target measured on a printer under test are converted to those of a reference printer of the same model. The correction is converted into tables in a printer profile (e.g., ICC profile) that a printer driver, operating system, or application may use in the printing process.

In accordance with the present invention, more detailed model-specific Device Targets may be generated, as described above, for each model or family of color rendering device and color measuring device combinations. That is, model-specific Device Targets may be generated for color rendering devices and the specific printing variables implemented by the color rendering device. For example, a separate model-specific Device Target may be generated for a specific model of color rendering device and the type of paper on which the color rendering device is printing. Another model-specific Device Target may be generated for the same model of color rendering device and the type of inks used by the color rendering device to print. As such, a more detailed model-specific Device Target may be chosen to calibrate a color rendering device of the same model under test using the same specific printing variables and the same or substantially similar specific color measuring device. As such and in accordance with the present invention, model-specific Device Targets may be generated accounting for specific rendering criteria, such as printer/paper/ink combinations, to more accurately calibrate a respective color rendering device under test using substantially the same printer/paper/ink combinations.

Furthermore and in accordance with the present invention, a plurality of model-specific Digital Targets may be generated for different models of color rendering device/color measuring device combinations, accounting for printer/paper/ink combinations, and stored in a computer workstation for the calibration of respective, color rendering devices under test. More specifically, respective model-specific Digital Targets for specific color rendering device/color measuring device combinations are determined as described above and stored in, for example, a library of model-specific Device Targets at a computer workstation. As such, when a color rendering device is to be calibrated, a stored model-specific Device Target, corresponding to the specific model of the color rendering device to be calibrated and the specific model of the color measuring device to be used to measure model-specific calibration targets printed on the color rendering device to be calibrated, is recalled. The model-specific Device Target is printed on the color rendering device to be calibrated and is measured by the respective color measuring device. The color measurements obtained by the color measuring device of the model-specific calibration target printed on the color rendering device to be calibrated are used to determine a correction profile for the color rendering device as described above. The determined correction profile is applied to the color rendering device under test to be used in the printing process so as to align any commanded color from the color rendering device under test to the reference color rendering device of the same model.

Figure 3:
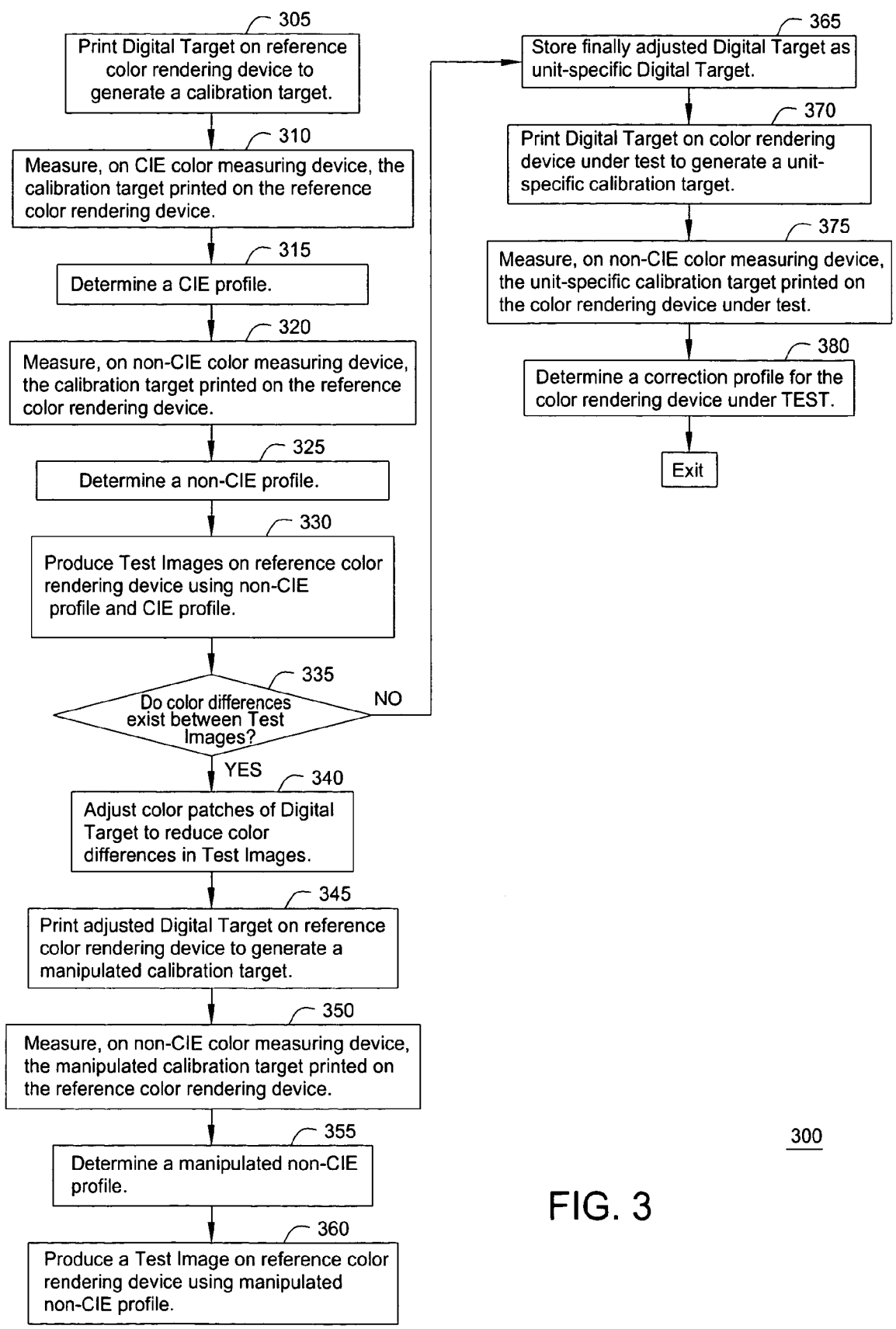
FIG. 3 depicts a flow diagram of an embodiment of a method for correcting known color rendering devices in accordance with the present invention.

FIG. 3 depicts a flow diagram of an embodiment of a method for correcting known color rendering devices in accordance with the present invention with reference to FIG. 1. The method 300 begins at step 305 where a Digital Target is printed by a reference printer 110 to generate a calibration target. More specifically, the computer workstation 140 instructs the reference printer 110 to print a predetermined Digital Target to generate a calibration target. The method 300 then proceeds to step 310.

At step 310, the calibration target printed by the reference printer 110 is measured by the calorimeter 150. The color measurement values obtained by the calorimeter 150 for the calibration target printed by the reference printer 110 are communicated to and stored at the computer workstation 140. The method 300 then proceeds to step 315.

At step 315, the computer workstation 140 determines a CIE profile from the color measurement values obtained by the colorimeter 150 for the calibration target printed by the reference printer 110. The method 300 then proceeds to step 320.

At step 320, the calibration target printed by the reference printer 110 is measured on the test scanner 120. The color measurement values obtained by the test scanner 120 for the calibration target printed by the reference printer 110 are communicated to and stored at the computer workstation 140. The method 300 then proceeds to step 325.

At step 325, the computer workstation 140 determines a non-CIE profile from the color measurement values obtained by the test scanner 120 for the calibration target printed by the reference printer 110. The method 300 then proceeds to step 330.

At step 330, Test Images are printed on the reference printer 110 using the CIE profile and the non-CIE profile. The method 300 then proceeds to step 335.

At step 335, the Test Image printed using the CIE profile is visually compared to the Test image printed using the non-CIE profile under controlled lighting, for example D50 lighting, to judge, for example, the color hues, saturations, gradients, densities and other image color factors to determine if the printed Test Images are the same. If color differences outside of a predetermined value exist between the Test Image printed using the CIE profile and the Test image printed using the non-CIE profile, the method 300 then proceeds to step 340. If color differences outside of a predetermined value do not exist between the Test Image printed using the CIE profile and the Test image printed using the non-CIE profile, the method 300 then proceeds to step 365.

At step 340, the input digital values of each target color of the Digital Target are adjusted in a manner tending to cause the color differences between the Test Image printed using the CIE profile and the Test image printed using the non-CIE profile to be reduced. The method 300 then proceeds to step 345.

At step 345, the adjusted Digital Target is printed on the reference printer 110 to generate a manipulated calibration target. The method 300 then proceeds to step 350.

At step 350, the manipulated calibration target printed by the reference printer 110 is measured on the test scanner 120. The color measurement values obtained by the test scanner 120 for the manipulated calibration target printed by the reference printer 110 are communicated to and stored at the computer workstation 140. The method 300 then proceeds to step 355.

At step 355, the computer workstation 140 determines a manipulated non-CIE profile from the color measurement values obtained by the test scanner 120 for the manipulated calibration target printed by the reference printer 110. The method 300 then proceeds to step 360.

At step 360, a Test Image is printed on the reference printer 110 using the manipulated non-CIE profile. The method then proceeds to step 335 and steps 335-360 are repeated until adjustments to the Digital Target reduce the differences in the Test Images to within an acceptable level.

At step 365, the finally adjusted Digital Target is stored as a model-specific Digital Target for the combination of the model of the reference printer 110 and the test scanner 120. The method 300 then proceeds to step 370.

At step 370, the unit specific Digital Target is printed on the printer under test 130 to generate a model-specific calibration target. The method 300 then proceeds to step 375.

At step 375, the model-specific calibration target printed by the printer under test 130 is measured by the test scanner 120. The color measurement values obtained by the test scanner 120 for the model-specific calibration target printed by the printer under test 130 are communicated to and stored at the computer workstation 140. The method 300 then proceeds to step 380.

At step 380, the computer workstation 140 determines a printer correction profile from the color measurement values obtained by the test scanner 120 for the model-specific calibration target printed by the printer under test 130 to be applied to the printer under test 130 to be used in the printing process so as to align any commanded color from the printer under test 130 to the reference printer 110. The method 300 is then exited.

Although FIG. 3 depicts a flow diagram of an embodiment of a method for correcting known color rendering devices in accordance with the present invention comprising listed steps, the steps of the flow diagram do not have to be performed in the order depicted in FIG. 3. It will be appreciated by those skilled in the art informed by the teachings of the present invention, that the method of correcting known color rendering devices of the present invention may be performed using the steps depicted in FIG. 3 in various other orders and combinations of the steps and may even include fewer or more steps in accordance with the present invention.

Figure 4:
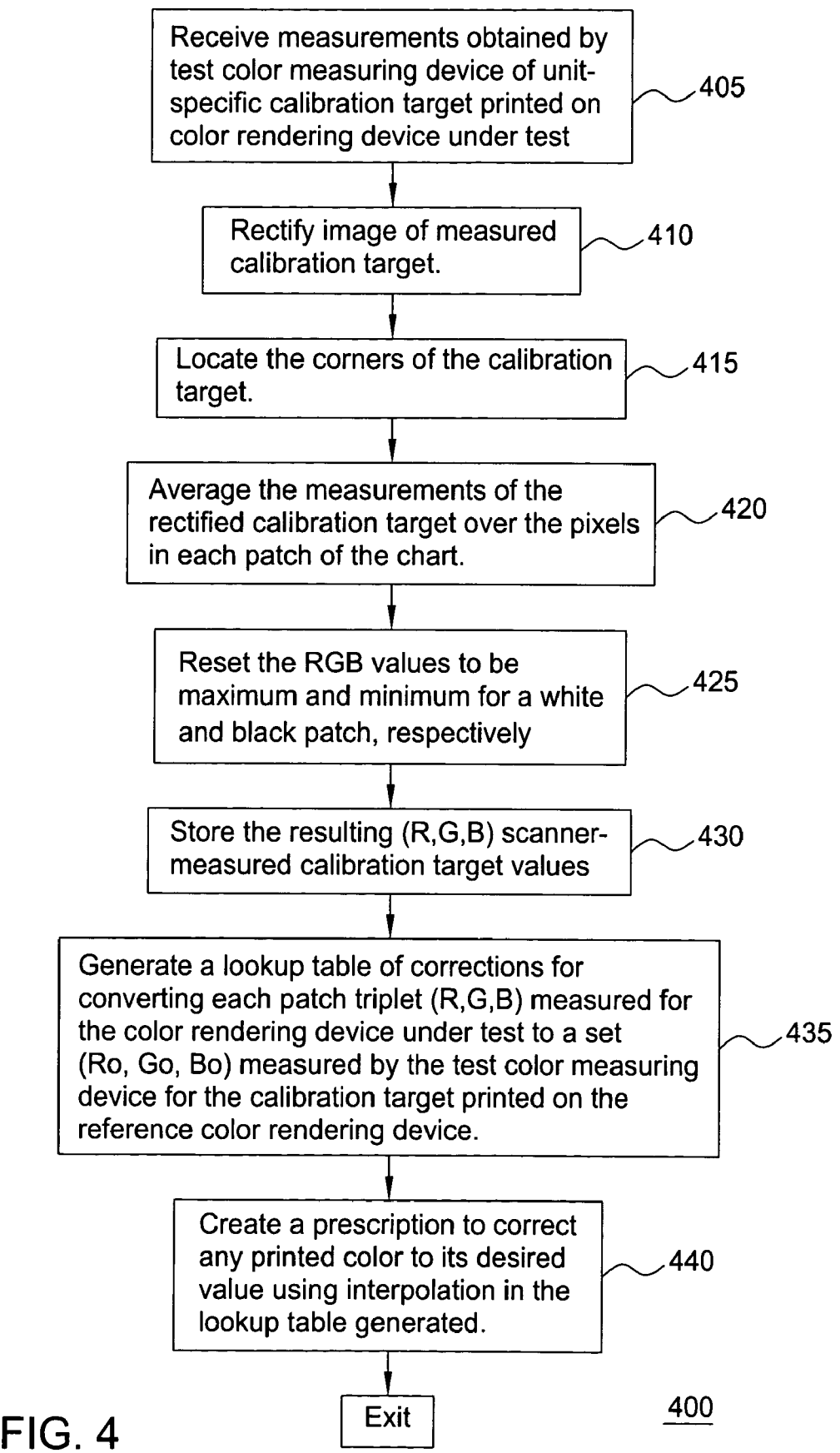
FIG. 4 depicts a flow diagram of an embodiment of a method for generating a printer correction profile for a printer under test in accordance with the present invention.

FIG. 4 depicts a flow diagram of an embodiment of a method for determining a printer correction profile for a printer under test in accordance with the present invention. The method 400 begins at step 405 where measurements made by a test scanner of a model-specific calibration target generated from a model-specific Digital Target and printed by a printer under test are received at the computer workstation. The method 400 then proceeds to step 410.

At step 410, the digital image of the measured model-specific calibration target is rectified. More specifically, the digital image is rotated until an edge detector shows the edges of the target to be substantially horizontal and vertical. The method 400 then proceeds to step 415.

At step 415, the positions of the corners of the calibration target are located by a method such as scanning 45-degree lines starting from the corners of the acquired image until they cross the respective corners of the target. The method 400 then proceeds to step 420.

At step 420, the red (R) color measurements of the rectified calibration target are averaged over the pixels in each patch of the chart (e.g., over a pixel sub-array in the center of each of the test patches on the chart). Similarly, the green (G) and blue (B) color measurements are averaged over the pixels in each patch of the chart. The method 400 then proceeds to step 425.

At step 425, the RGB values are reset to be maximum and minimum for a white and black patch, respectively. For example, for maximum and minimum digital values of 255 and 0, for measured white-patch values ($R_w$, $G_w$, $B_w$), and for measured black-patch values ($R_b$, $G_b$, $B_b$), any scanned color (R, G, B) is reset to 255 $(R-R_b)/(R_w-R_b)$, 255 $(G-G_b)/(G_w-G_b)$, and 255 $(B-B_b)/(B_w-B_b)$. The method 400 then proceeds to step 430.

At step 430, the resulting (R,G,B) scanner-measured calibration target values are stored at the computer workstation in a digital file. The method 400 then proceeds to step 435.

At step 435, a lookup table of corrections is generated that converts each patch triplet (R,G,B) measured by the test scanner for the model-specific calibration target printed on the printer under test to a set ($R_o$, $G_o$, $B_o$) measured by the test scanner for the model-specific calibration target printed on the reference printer. The method then proceeds to step 440.

At step 440, a prescription to correct any printed color to its desired value is created using interpolation in the lookup table generated in step 435 of the method 400. The corrections are stored and a correction profile is generated for the printer under test. The correction profile is subsequently applied to the printer under test to correct the color of any subsequent prints made by the printer under test. The method 400 is then exited.

The above method 400 may be used to modify an International Color Consortium (ICC) profile of a printer under test. The ICC Profile Format is a file format that is described in the paper, International Color Consortium Profile Format (version 3.01, May 8, 1995). As described in the paper, a "profile" is a data table which is used for color conversion, the translation of color image data from one color or colorant coordinate system to another. The ICC Profile Format provides for embedding profiles with image data. Generally, the above method 400 converts test scanner-measured RGB values of patches from a printer-model-specific calibration target to those of a reference printer of the same model. The correction is converted into tables in a printer profile (e.g., ICC profile) that a printer driver, operating system, or application may use in the printing process.

Although FIG. 4 depicts a flow diagram of an embodiment of a method for determining a printer correction profile for a printer under test in accordance with the present invention comprising listed steps, the steps of the flow diagram do not have to be performed in the order depicted in FIG. 4. It will be appreciated by those skilled in the art informed by the teachings of the present invention, that the method of determining a printer correction profile for a printer under test of the present invention may be performed using the steps depicted in FIG. 4 in various other orders and combinations of the steps and may include fewer or more steps in accordance with the present invention.

Figure 5:
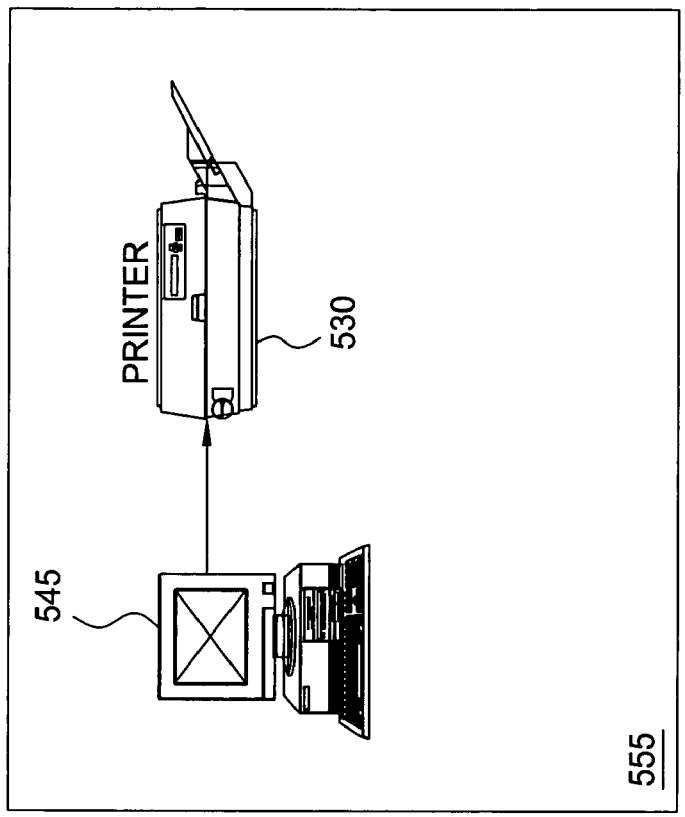
FIG. 5 depicts a high level block diagram of an embodiment of a remote color correction system for a known color rendering device in accordance with the present invention.
Figure 5:
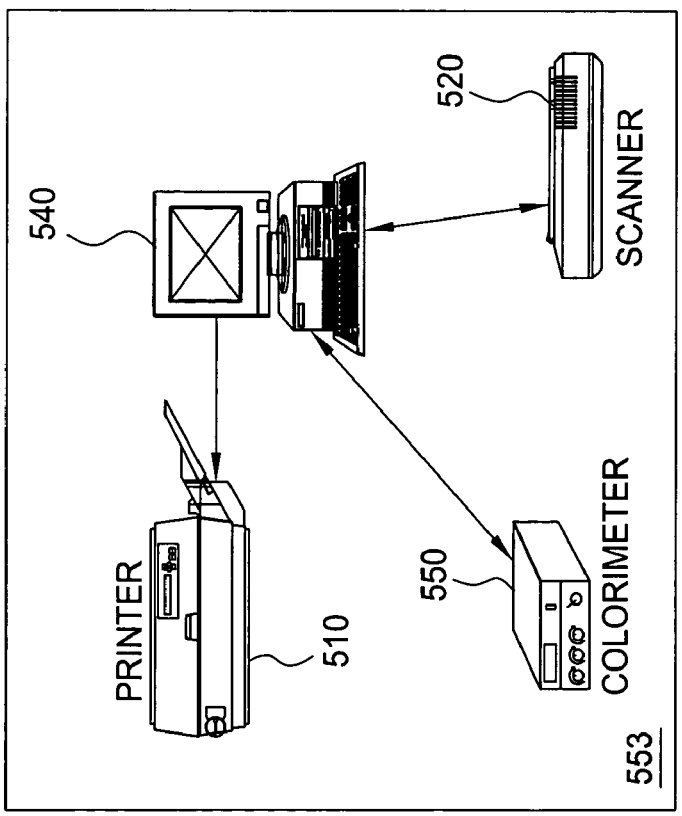

FIG. 5 depicts a high level block diagram of an embodiment of a remote color correction system in accordance with the present invention. The remote color correction system 500 of FIG. 5 illustratively comprises a reference color rendering device (illustratively a first printer) 510, a test non-CIE color measuring device (illustratively a first test scanner) 520, a first computer workstation 540, and a CIE color measuring device (illustratively a calorimeter) 550 all located at a first location 553. As depicted in FIG. 5, the reference color rendering device 510, the test color measuring device 520 and the CIE color measuring device are all in communication with the computer workstation 540. The remote color correction system 500 of FIG. 5 further comprises a color rendering device under test (illustratively a second printer of the same model as the reference printer) 530 and a second computer workstation 545 located at a second location 555. As depicted in FIG. 5, the color rendering device under test 530 and the computer workstation 545 are in communication.

In the remote color correction system 500 of FIG. 5, the method of correcting a remotely located color rendering device is substantially the same as described in the color correction system 100 of FIG. 1. More specifically, in the remote color correction system 500 of FIG. 5, a Digital Target is printed by the reference printer 510. The printed calibration target is measured on the test scanner 520 as described above. The measurements taken by the test scanner 520 are communicated to and stored at the first computer workstation 540. The printed calibration target is also measured by the calorimeter 550, as described above. The measurements taken by the colorimeter 550 are also communicated to and stored at the first computer workstation 540. The first computer workstation 540 determines a CIE profile from the color measurement values obtained by the calorimeter 550 for the calibration target printed by the reference printer 510 and a non-CIE profile from the color measurement values obtained by the test scanner 520 for the calibration target printed by the reference printer 510. Using the CIE profile and the non-CIE profile, the first computer workstation 540 determines a model-specific Digital Target in accordance with the present invention, by, for example, implementing steps 330 to 365 of the method 300 described above. The model-specific Digital Target determined for the printer/scanner combination of the remote color correction system 500 of FIG. 5 is stored in the first computer workstation 540.

In the remote color correction system 500 of FIG. 5, the test scanner 520 and the model-specific Digital Target are forwarded to the second location 555. At the second location 555, the test scanner 520 is adapted to communicate with the second computer workstation 545, and the forwarded model-specific Digital Target is stored at the second computer workstation 545. The model-specific Digital Target may be forwarded to the second location 555 and loaded into the second computer workstation 545 using, for example, computer readable medium. At the second location 555, the second computer workstation 545 instructs the printer under test 530 to print the model-specific Digital Target. The printed model-specific calibration target is then measured by the test scanner 520. The measurements taken by the test scanner 520 are communicated to and stored at the second computer workstation 545. The second computer workstation 545 determines a printer correction profile from the color measurement values obtained by the test scanner 520 for the model-specific calibration target printed by the printer under test 530. The determined printer correction profile is applied to the printer under test 530 to be used in the printing process so as to align any commanded color from the printer under test 530 to the reference printer 510. The correction values may be converted into tables in a printer profile (e.g., ICC profile), as described above, that a printer driver, operating system, or application may use in the printing process.

Although in the embodiment of the remote color correction system 500 of FIG. 5 it was described that the model-specific Digital Target and the non-CIE and CIE profiles were determined by the first computer workstation 540 located at the first location 553 from color measurement values obtained by a test scanner and a colorimeter of a calibration target printed by a reference printer, in alternate embodiments of the present invention, color measurement values obtained by a test scanner and a calorimeter of a calibration target printed by a reference printer may be forwarded to a second location where a second computer workstation may determine the model-specific Digital Target and the non-CIE and CIE profiles from the forwarded color measurement values.

As in the color correction system 100 of FIG. 1, in the remote color correction system 500 of FIG. 5, Digital Targets to be reproduced by color rendering devices may be adjusted to account for the printing characteristics of a specific color rendering device or family of color rendering devices and for the measuring characteristics of an implemented non-CIE color measuring device. Additionally and as described above, a plurality of color rendering device targets may be generated for different models of color rendering devices and stored in a computer workstation for the calibration of respective, same model test color rendering devices. As also described above, more specific Device Targets may be generated for each model or family of color rendering devices. That is, Device Targets may be generated for specific types of accessories implemented by a color rendering device to reproduce a calibration target. Separate Device Targets may be generated for a specific model of color rendering device depending on what type of paper the calibration target is to be printed or what types of inks are used to print the calibration target. As such, a more detailed and specific Device Target may be chosen to calibrate a color rendering device of the same model under test using specific paper or ink and being measured by a specific color measuring device.

Figure 6:
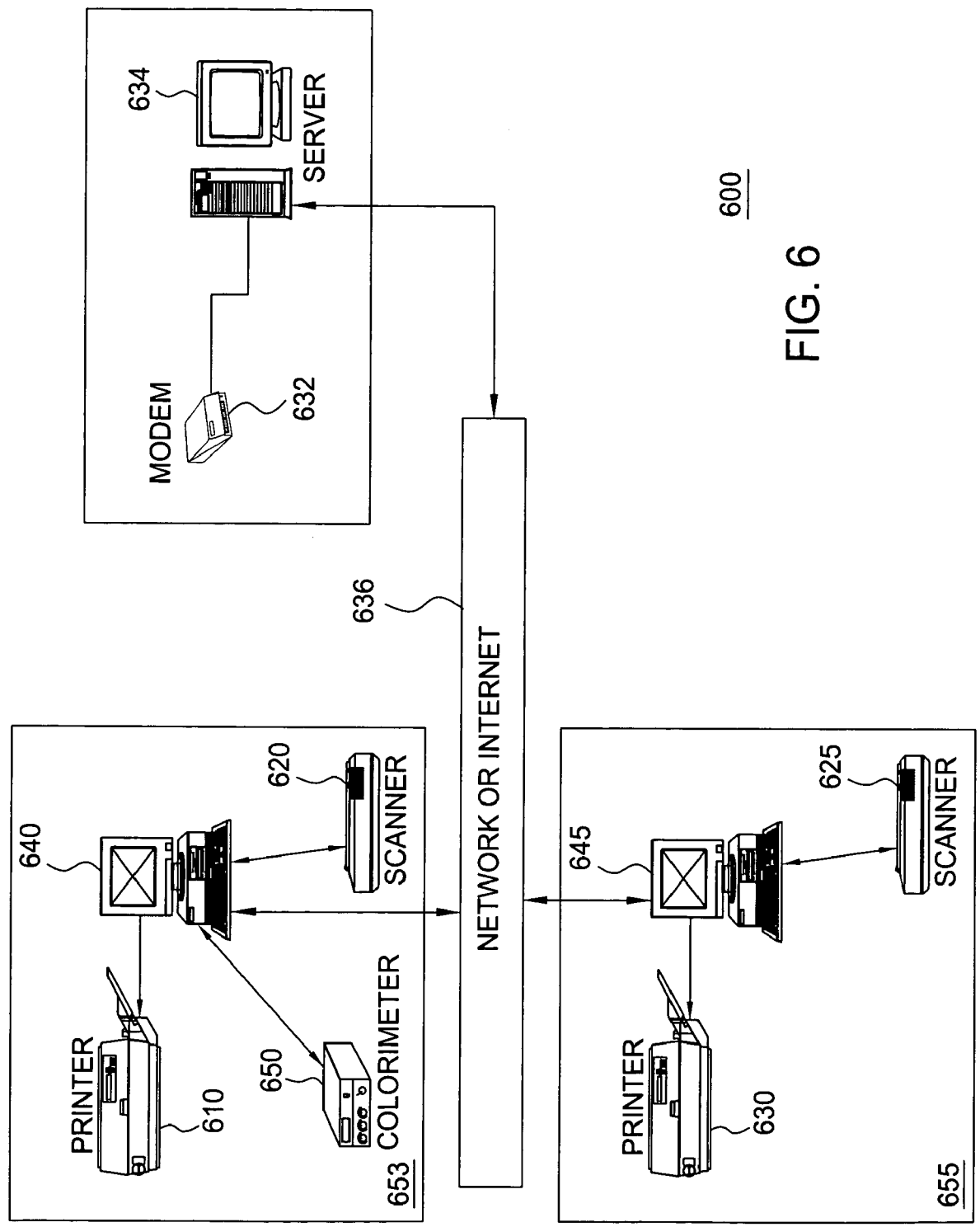
FIG. 6 depicts a high level block diagram of an alternate embodiment of the remote color correction system of FIG. 5.

FIG. 6 depicts a high level block diagram of an alternate embodiment of a remote color correction system in accordance with the present invention. The remote color correction system 600 of FIG. 6 illustratively comprises a reference color rendering device (illustratively a first printer) 610, a reference color measuring device (illustratively a first scanner) 620, a first computer workstation 640 and a CIE color measuring device (illustratively a colorimeter) 650 all located at a first location 653. As depicted in FIG. 6, the reference color rendering device 610, the reference color measuring device 620 and the CIE color measuring device 650 are all in communication with the first computer workstation 640. The remote color correction system 600 of FIG. 6 further comprises a color rendering device under test (illustratively a second printer of the same model as the reference printer) 630, a test color measuring device (illustratively a second scanner of the same model as the first scanner) 625 and a second computer workstation 645 located at a second location 655. As depicted in FIG. 6, the color rendering device under test 630 and the test color measuring device 625 are both in communication with the second computer workstation 645. In addition, modem connections 632 to a server 634 are employed in instances when there is a dedicated network between the first location 653 and the second location 655. If not, communication between the first location 653 and the second location 655 (i.e., communication between the first computer workstation 640 and the second computer workstation 645) may be effected through the Internet, both designated by identifier 636.

In the remote color correction system 600 of FIG. 6, the reference scanner 620 is calibrated. More specifically, in one embodiment of the present invention white and black patches are used for automatic adjustment of the reference scanner 620 (i.e., as provided by scanner manufacturers). Next, calibrated patches (e.g., cyan, magenta, and yellow patches from a consistent CMYK chart, which have high reproducibility because each patch is made from a single, primary ink) are measured on the reference scanner 620. The measurements of the patches obtained by the reference scanner 620 are communicated to the first computer workstation 640, where the hue and saturation of the measurements are recorded.

In the remote color correction system 600 of FIG. 6, a Digital Target is printed by the reference printer 610. The printed calibration target is measured on the reference scanner 620. The measurements taken by the reference scanner 620 are communicated to and stored at the first computer workstation 640. The printed calibration target is also measured by the calorimeter 650. The measurements taken by the colorimeter 650 are also communicated to and stored at the first computer workstation 640. The first computer workstation 640 determines a CIE profile from the color measurement values obtained by the colorimeter 650 for the calibration target printed by the reference printer 610 and a non-CIE profile from the color measurement values obtained by the reference scanner 620 for the calibration target printed by the reference printer 610. Using the CIE profile and the non-CIE profile, the first computer workstation 640 determines a model-specific Digital Target in accordance with the present invention, by, for example, implementing steps 330 to 365 of the method 300 described above. The model-specific Digital Target determined for the printer/scanner combination of the remote color correction system 600 of FIG. 6 is stored in the first computer workstation 640. The determined model-specific Digital Target stored in the first computer workstation 640 is then communicated to the second computer workstation 645 at the second location 655 via the dedicated network or the Internet 626.

In the remote color correction system 600 of FIG. 6, the test scanner 625 at the second location 655 is calibrated to the reference scanner 620 at the first location 650 prior to using the reference scanner 620 for obtaining color measurements of a model-specific calibration target generated from the model-specific Digital Target and printed on the printer under test 630. More specifically, in one embodiment of the present invention white and black patches are used for automatic adjustment of the test scanner 625 (i.e., as provided by scanner manufacturers). Next, calibrated patches (e.g., cyan, magenta, and yellow patches from a consistent CMYK chart, which have high reproducibility because each patch is made from a single, primary ink) are measured on the test scanner 625. The measurements of the patches on the test scanner 625 are communicated to the second computer workstation 645, where the hue and saturation of the measurements are recorded. At the computer workstation 645, the hue and saturation of the recorded values are adjusted to match cyan, magenta and yellow hue and saturation values previously measured by the reference scanner 620 and previously recorded at the first computer workstation 640 at the first location 653. The measurements made by the reference scanner 620 and the test scanner 625 may be compared at the first location 653 or the second location 655 by the first computer workstation 640 or the second computer workstation 645, respectively. That is, recorded information regarding the hue and saturation of the measurements of the calibrated patches measured by the test scanner 625 at the second location 655 may be communicated to the first location 650 and the first computer workstation 640 or recorded information regarding the hue and saturation of the measurements of the calibrated patches measured by the reference scanner 620 may be communicated to the second location 655 and the second computer workstation 645 via the dedicated network or the Internet 636. The measurements of the patches on the test scanner 625 are compared to the measurements of the patches on the reference scanner 620 to determine a scanner correction profile for the second test scanner 625 so as to align any color values measured by the test scanner 625 to the reference scanner 620 of the same model or another model having substantially similar measuring characteristics. The scanner correction profile is then applied to all subsequent measurements taken by the test scanner 625.

At the second location 655, the second computer workstation 645 instructs the printer under test 630 to print the model-specific Digital Target. The printed model-specific calibration target is then measured by the test scanner 625 having the scanner correction profile applied as described above. The measurements taken by the test scanner 625 are communicated to and stored at the second computer workstation 645. The second computer workstation 645 determines a printer correction profile from the color measurement values obtained by the test scanner 625 for the model-specific calibration target printed by the printer under test 630. The determined printer correction profile is applied to the printer under test 630 to be used in the printing process so as to align any commanded color from the printer under test 630 to the reference printer 610. The correction values may be converted into tables in a printer profile (e.g., ICC profile), as described above, that a printer driver, operating system, or application may use in the printing process.

Although in the embodiment of the remote color correction system 600 of FIG. 6 it was described that the model-specific Digital Target and the non-CIE and CIE profiles were determined by the first computer workstation 640 located at the first location 653 from color measurement values obtained by the reference scanner 620 and a colorimeter 650 of a calibration target printed by a reference printer 610, in alternate embodiments of the present invention, color measurement values obtained by a reference scanner and a calorimeter of a calibration target printed by a reference printer may be communicated to a second location via, for example, a dedicated network or Internet where a second computer workstation may determine the model-specific Digital Target and the non-CIE and CIE profiles from the forwarded color measurement values.

In alternate embodiments of the present invention, predetermined model-specific Digital Targets stored at, for example, a first computer workstation at a first location may be used to calibrate a color rendering device of the same model as the color rendering device implemented in determining a respective, stored model-specific Digital Target using the same color measuring device or a color measuring device having substantially similar color measuring characteristics. Even further, predetermined model-specific Digital Targets stored at, for example, a first computer workstation at a first location may be communicated to and used by a second computer workstation at the first location or at a remote location to calibrate a color rendering device of the same model as the color rendering device implemented in determining a respective, stored model-specific Digital Target using the same color measuring device or a color measuring device having substantially similar color measuring characteristics. More specifically, a new model-specific Digital Target for a color rendering device/color measuring device combination does not have to be determined each time a color rendering device is to be calibrated using the same color measuring device or a color measuring device having substantially similar color measuring characteristics. Stored model-specific Digital Targets and color measuring device profiles may be implemented in the calibration of a respective color rendering device.

While the foregoing is directed to embodiments of the present invention, other and further embodiments of the invention may be devised without departing from the basic scope thereof, and the scope thereof is determined by the claims that follow.

The invention claimed is:

1. A method, comprising:
  determining a model-specific Digital Target for a first color rendering device and a first non-CIE color measuring device combination; and
  implementing said model-specific Digital Target for calibrating a second color rendering device,
  wherein said determining said model specific Digital Target comprises the steps of:
   a) reproducing a predetermined Digital Target on said first color rendering device;
   b) obtaining color measurements of said predetermined Digital Target as reproduced by said first color rendering device on a CIE color measuring device;
   c) determining a CIE profile from the color measurements of said CIE color measuring device;
   d) generating at least one test image on said first color rendering device using said CIE profile;
   e) obtaining color measurements of said predetermined Digital Target as reproduced by said first color rendering device on said first non-CIE color measuring device;
   f) determining a non-CIE profile from the color measurements of said first non-CIE color measuring device;
   g) generating at least one test image on said first color rendering device using said non-CIE profile;
   h) comparing said at least one test image generated using said CIE profile to said at least one test image generated using said non-CIE profile to determine if a color difference exists between said at least one test image generated using said CIE profile and said at least one test image generated using said non-CIE profile; and
   i) in response to a color difference in said at least one test image generated using said CIE profile and said at least one test image generated using said non-CIE profile, adjusting a digital color patch of said predetermined Digital Target in a manner to cause said color difference to be reduced.

2. The method of claim 1, further comprising the steps of:
   j) reproducing said Digital Target, as adjusted, on said first color rendering device; and
   k) repeating steps e)-h) until a color difference in said at least one test image generated using said CIE profile and said at least one test image generated using said non-CIE profile are within predetermined allowable values.

3. The method of claim 2, wherein said predetermined allowable values are user determinable dynamic values.

4. The method of claim 1, wherein said at least one test image generated using said CIE profile and said at least one test image generated using said non-CIE profile are compared under controlled conditions.

5. The method of claim 4, wherein said controlled conditions comprise at least D50 lighting.

6. The method of claim 1, wherein said at least one test image generated using said CIE profile and said at least one test image generated using said non-CIE profile are visually compared.

7. The method of claim 1, wherein one or more image color factors, including at least one of: color hues, saturations, gradients, and densities of the test images, are compared to determine the color difference.

8. The method of claim 1, wherein implementing said model-specific Digital Target comprises the steps of:
  a) reproducing said model-specific Digital Target on said second color rendering device;
  b) obtaining color measurements of said model-specific Digital Target as reproduced on a non-CIE color measuring device having substantially similar measuring characteristics as said first non-CIE color measuring device; and
  c) determining a non-CIE profile to be applied to said second color rendering device for calibrating said second color rendering device.

9. The method of claim 8, wherein said non-CIE color measuring device having substantially similar measuring characteristics as said first non-CIE color measuring device is said first non-CIE color measuring device.

10. The method of claim 8, wherein said non-CIE color measuring device having substantially similar measuring characteristics as said first non-CIE color measuring device comprises a second non-CIE color measuring device of substantially a same make and model as said first non-CIE color measuring device.

11. The method of claim 10, further comprising calibrating the measuring characteristics of said second non-CIE color measuring device to measuring characteristics of said first non-CIE color measuring device.

12. The method of claim 1, wherein a model-specific Device Target is determined for various combinations of color measuring devices, color rendering devices, and various printing variables of each of said color rendering devices.

13. The method of claim 12, wherein said various printing variables include at least one of papers and inks used in rendering.

14. The method of claim 1, wherein said second color rendering device comprises rendering characteristics that are substantially similar to rendering characteristics of said first color rendering device.

15. The method of claim 1, wherein a model-specific Digital Target is reproduced on said second color rendering device to determine color variances.

16. A system for determining model-specific Digital Targets to be used in calibrating color rendering devices, comprising:
  a first color rendering device for reproducing predetermined Digital Targets;
  a first non-CIE color measuring device for obtaining non-CIE color measurements of said Digital Targets as reproduced by said first color rendering device;
  a CIE color measuring device for obtaining CIE color measurements of said Digital Targets as reproduced by said first color rendering device; and
  a controller for determining model-specific Digital Targets for a combination of said first color rendering device and said first non-CIE color measuring device, and for implementing said model-specific Digital Targets as determined by the controller for calibrating at least one second color rendering device,
  wherein determining a model-specific Digital Target of said Digital Targets by said controller comprises:
    a) reproducing a predetermined Digital Target on said first color rendering device;
    b) obtaining color measurements of said Digital Target as reproduced on said first color rendering device on said CIE color measuring device;
    c) determining a CIE profile from the color measurements of said CIE color measuring device;
    d) generating at least one test image on said first color rendering device using said CIE profile;
    e) obtaining color measurements of said Digital Target as reproduced on said first color rendering device on said first non-CIE color measuring device;
    f) determining a non-CIE profile from the color measurements of said first non-CIE color measuring device;
    g) generating at least one test image on said first color rendering device using said non-CIE profile;
    h) comparing said at least one test image generated using said CIE profile to said at least one test image generated using said non-CIE profile to determine if a color difference exists between said at least one test image generated using said CIE profile to said at least one test image generated using said non-CIE profile; and
    i) in response to said color difference in said at least one test image generated using said CIE profile to said at least one test image generated using said non-CIE profile, adjusting a digital color patch of said predetermined Digital Target in a manner to cause said color difference to be reduced.

17. The system of claim 16, further comprising:
  j) reproducing said Digital Target, as adjusted, on said first color rendering device; and
  k) repeating steps e)-h) until one or more color differences in said at least one test image generated using said CIE profile to said at least one test image generated using said non-CIE profile are within predetermined allowable values to determine a model-specific Digital Target.

18. The system of claim 16, wherein determined model-specific Digital Targets are stored in a memory of said controller to be used for calibrating color rendering devices having rendering characteristics that are substantially similar to rendering characteristics of said first color rendering device.

19. The system of claim 16, wherein the implementing of each of said model-specific Digital Targets by said controller comprises:
  a) reproducing a determined model-specific Digital Target on a second color rendering device;
  b) obtaining color measurements of said model-specific Digital Target as reproduced on said second color rendering device on a non-CIE color measuring device having measuring characteristics that are substantially similar to measuring characteristics of said first non-CIE color measuring device; and
  c) determining a non-CIE profile from said color measurements obtained by said non-CIE color measuring device, said non-CIE profile to be applied to said second color rendering device for calibrating said second color rendering device.

20. The system of claim 19, wherein said second color rendering device comprises a color rendering device of substantially a same make and model as said first color rendering device.

21. The system of claim 16, wherein each of said Digital Targets comprises a predetermined set of digitally stored color patches.

22. The system of claim 16, wherein each of said Digital Targets, Reproduced, comprises seven hundred and twenty-nine colors, each of said seven hundred and twenty-nine colors being associated with CIE Lab color values.

23. The system of claim 16, wherein said first color rendering device comprises a printer.

24. The system of claim 16, wherein said first non-CIE color measuring device comprises a scanner.

25. The system of claim 16, wherein said CIE color measuring device comprises a colorimeter.

26. The system of claim 16 wherein said controller comprises a computer workstation.

27. The system of claim 16 wherein a model-specific Device Target is determined for various combinations of color measuring devices, color rendering devices, and various printing variables of each of said color rendering devices.

28. The system of claim 27, wherein said various printing variables include at least one of: papers and inks used in rendering.

29. The system of claim 16, wherein said at least one second color rendering device comprises rendering characteristics that are substantially similar to rendering characteristics of said first color rendering device.

30. A remote system for calibrating color rendering devices, comprising:
at a first location:
   a first color rendering device for reproducing predetermined Digital Targets;
   a first non-CIE color measuring device for obtaining non-CIE color measurements of reproduced Digital Targets;
   a CIE color measuring device for obtaining CIE color measurements of said reproduced Digital Targets; and
   a controller for determining model-specific Digital Targets for a combination of said first color rendering device and said first non-CIE color measuring device; and
at a second location:
   a second color rendering device for reproducing determined model-specific Digital Targets; and
   a second controller for implementing said determined model-specific Digital Targets for calibrating said second color rendering device,
wherein determining a model-specific Digital Target of said Digital Targets by said controller comprises:
   a) reproducing a predetermined Digital Target on said first color rendering device;
   b) obtaining color measurements of said predetermined Digital Target, as reproduced, on said CIE color measuring device;
   c) determining a CIE profile from the color measurements of said CIE color measuring device;
   d) generating at least one test image on said first color rendering device using said CIE profile;
   e) obtaining color measurements of said predetermined Digital Target, as reproduced, on said first non-CIE color measuring device;
   f) determining a non-CIE profile from the color measurements of said first non-CIE color measuring device;
   g) generating at least one test image on said first color rendering device using said non-CIE profile;
   h) comparing said at least one test image generated using said CIE profile to said at least one test image generated using said non-CIE profile to determine if a color difference exists between said at least one test image generated using said CIE profile to said at least one test image generated using said non-CIE profile; and
   i) in response to said color difference in said at least one test image generated using said CIE profile to said at least one test image generated using said non-CIE profile, adjusting a digital color patch of said Digital Target in a manner to cause said color difference to be reduced.

31. The remote system of claim 30, further comprising:
   j) reproducing said Digital Target, as adjusted, on said first color rendering device; and
   k) repeating steps e)-h) until one or more color differences in said at least one test image generated using said CIE profile to said at least one test image generated using said non-CIE profile are within predetermined allowable values to determine a model-specific Digital Target.

32. The remote system of claim 30, wherein said first non-CIE color measuring device and a determined model-specific Digital Target are forwarded to said second location and the implementing said model-specific Digital Target of said second controller comprises:
   a) reproducing said model-specific Digital Target on said second color rendering device;
   b) obtaining color measurements of said model-specific Digital Target, as reproduced on said second color rendering device, on said first non-CIE color measuring device; and
   c) determining a non-CIE profile from said color measurements obtained by said first non-CIE color measuring device, said non-CIE profile to be applied to said second color rendering device for calibrating said second color rendering device.

33. The remote system of claim 30, further comprising a second non-CIE color measuring device and wherein a determined model-specific Digital Target is communicated to said second location, wherein the implementing said model-specific Digital Target of said second controller comprises:
   a) reproducing said model-specific Digital Target on said second color rendering device;
   b) obtaining color measurements of said model-specific Digital Target, as reproduced on said second color rendering device, on said second non-CIE color measuring device, said second non-CIE color measuring device having measuring characteristics that are substantially similar to measuring characteristics of said first non-CIE color measuring device; and
   c) determining a non-CIE profile from said color measurements obtained by said second non-CIE color measuring device, said non-CIE profile to be applied to said second color rendering device for calibrating said second color rendering device.

34. The remote system of claim 33, further comprising calibrating said second non-CIE color measuring device to said first non-OLE color measuring device prior to obtaining color measurements of said model-specific Digital Target, as reproduced on said second color rendering device on said second non-CIE color measuring device.

35. The remote system of claim 33, further comprising a network, wherein said determined model-specific Digital Target is communicated to said second location via said network.

36. The remote system of claim 33; further comprising an Internet, wherein said determined model-specific Digital Target is communicated to said second location via said Internet.

* * * * *